United States Patent [19]
Allen et al.

[11] Patent Number: 5,236,641
[45] Date of Patent: Aug. 17, 1993

[54] METERING MELTBLOWING SYSTEM

[75] Inventors: Martin A. Allen; John T. Fetcko, both of Dawsonville, Ga.

[73] Assignee: Exxon Chemical Patents Inc., Linden, N.J.

[21] Appl. No.: 757,848

[22] Filed: Sep. 11, 1991

[51] Int. Cl.⁵ .............................................. B29C 47/34
[52] U.S. Cl. ................................. 264/40.1; 264/40.7; 264/518; 264/555; 264/210.8; 425/66; 425/72.2; 425/141; 425/145
[58] Field of Search .................... 264/40.1, 40.4, 40.7, 264/29.2, 518, 555, 211.17, 211.14, 210.8; 425/66, 72.2, 80.1, 83.1, 135, 140, 141, 145, 147; 156/167, 181, 441, 64; 19/299

[56] References Cited

U.S. PATENT DOCUMENTS

| | | | |
|---|---|---|---|
| 4,268,235 | 5/1981 | Bean et al. | 425/83.1 |
| 4,708,619 | 11/1987 | Balk | 425/141 |
| 4,818,463 | 4/1989 | Buehning | 264/210.8 |
| 4,820,142 | 4/1989 | Balk | 425/141 |
| 4,983,109 | 1/1991 | Miller et al. | 264/518 |

*Primary Examiner*—Jill L. Heitbrink
*Attorney, Agent, or Firm*—R. L. Graham; R. W. Mulcahy

[57] ABSTRACT

A meltblowing system with a modular die design and on-line monitoring of web properties is described. The modular die consists of individually fed side-by-side meltblowing units. Automated control of the polymer feed rates to the units have been shown to produce a web with excellent uniformity of basis weight. The die also features a valve assembly for minimizing polymer afterflow and die tip plugging.

19 Claims, 7 Drawing Sheets

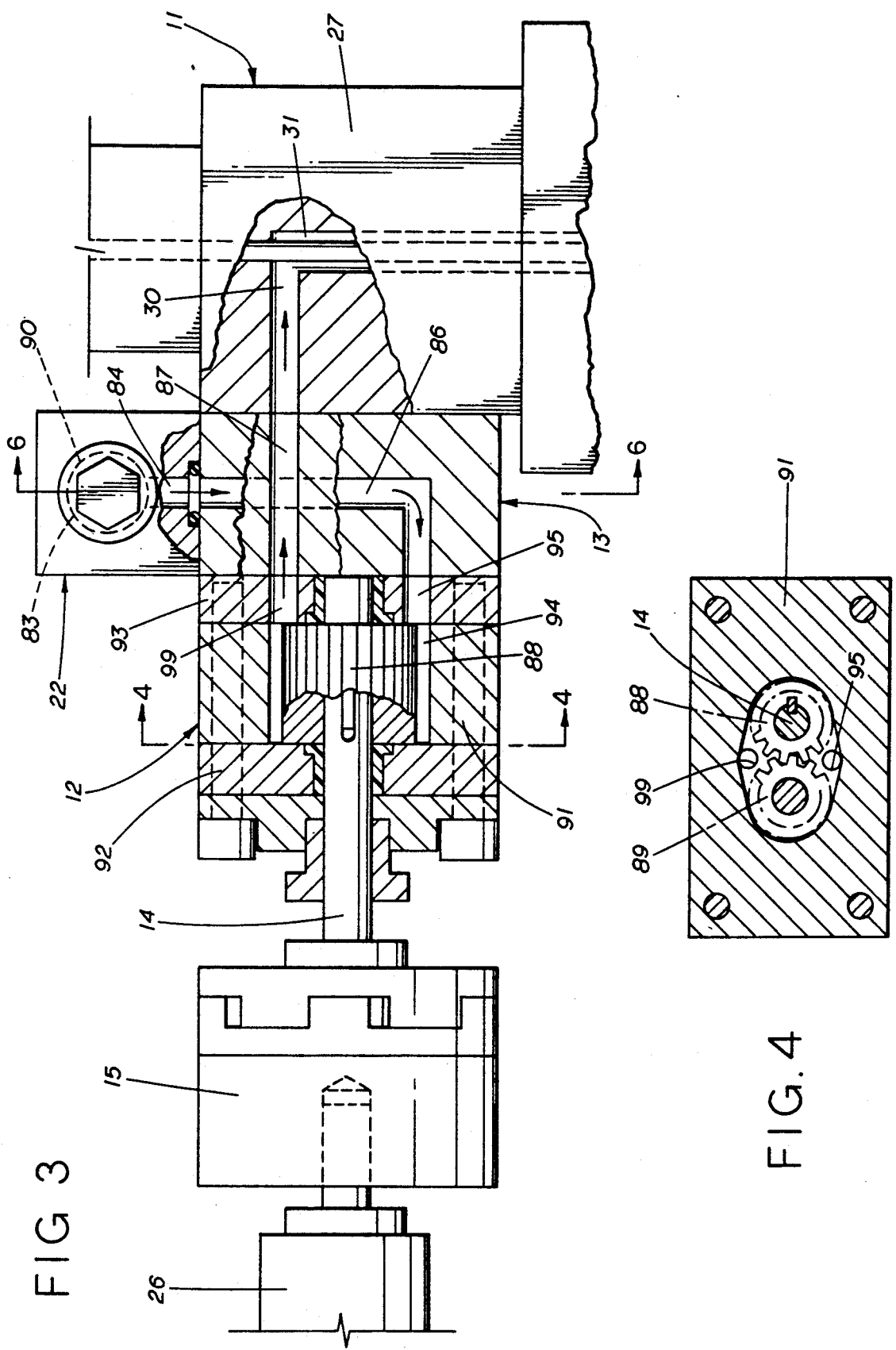

METERING MELTBLOWING SYSTEM

BACKGROUND OF THE INVENTION

This invention relates generally to meltblowing apparatus and processes. In one aspect, it relates to a meltblowing die consisting of side-by-side units for meltblowing polymer filaments, each unit including metering means to control the flow of polymer melt therethrough.

Meltblowing is a process for forming nonwoven webs by extruding a polymer melt through a plurality of orifices while contacting the extruded filaments with hot air to drawdown and attenuate the filaments into microsize fibers. The fibers are collected in random on a collector such as a rotary screen or surface forming an entangled fibrous web. The microfibers in the web resulting from the extreme drawdown impart unique properties to the web, making them ideally suited for several applications including filters, oil wipes, battery separators, oil absorbers, layers of web within diapers, and other absorbent products, etc.

The meltblowing die must be carefully designed and machined in order to provide the web of the quality (in terms of uniformity in basis weight and thickness) for many of the above industrial applications. The several variables in the process such as polymer throughput, air flow rate, collector take-up rate, and the like must be carefully controlled to provide a web with generally uniform properties for many applications. For wide webs, this sometimes is a problem because of the difficulty in achieving uniform polymer flow and air flow throughout the length of the die. Uniform flow of the melt through the die is normally achieved by the use of a balancing flow channel. (Sometimes referred to as a coat hanger die or flow channel) such as that disclosed in U.S. Pat. No. 4,818,463. This channel is carefully machined to provide a uniform distribution of the polymer to the orifices. In order to provide a uniform air flow across the die, the die assembly sometimes is provided with diverters in the flow channel and means for uniformly distributing the air across the air inlets to the die, as disclosed in U.S. Pat. No. 4,818,463.

The dies disclosed in the above U.S. Patent, as well as other commercial meltblowing dies, generally have one polymer inlet through which the polymer melt flows into the coat hanger channel. For small dies, the aforementioned coat hanger balancing channel is satisfactory, particularly when coupled with the uniformly controlled airflow. However, for medium to long dies, the polymer flow from the single polymer inlet to the orifices is long, particularly at the outer ends of the die. This introduces variations in melt flow through the orifices and adversely affects the quality of the web, particularly the uniformity of web basis weight and thickness.

SUMMARY OF THE INVENTION

The method and apparatus of the present invention provides for two separate, but interrelated, novel meltblowing features: (1) the segmented construction of the die assembly with separate pumps and controls permit the meltblowing operation to be carried out in short die length units producing an integral web composed of side-by-side strips extending in the machine direction, and (2) in a preferred embodiment the segmented construction also permits monitoring of the web strips by sensors interfaced with feedback controls for adjusting the operation of each meltblown unit to produce a web of uniform or controlled properties (e.g., thickness or basis weight.)

In the first embodiment mentioned above, the die assembly in the system is constructed to have a plurality of parallel flow passages so that meltblowing is from separate side-by-side meltblowing units. While only one air system is provided for the full length of the die, the polymer extrusion is from each unit comprising a linear group of orifices, with each orifice group being fed by its own positive displacement pump. Thus, the die system functions as a plurality of side-by-side meltblowing units to form a single uniform meltblown web. Each meltblowing unit forms one longitudinal strip in the integral web.

In the second and preferred embodiment mentioned above, probes are provided to monitor a physical property (e.g. basis weight or thickness) of each web strip, and instruments feed back a signal to the motor used to drive the pump of each meltblowing unit to maintain the control property of each strip substantially constant.

The segmented die of the present invention has been shown to produce large webs with excellent uniformity of basis weight and thickness over the width of the web. A novel feature of the present invention, however, is that it can be used to produce webs with predetermined variations of basis weight and/or thickness over the web width. This is done by simply feeding the side-by-side meltblowing units at different rates. The feedback control of the second embodiment above works equally well in this mode of operation.

The die system of the present invention preferably includes valve assemblies in each unit to interrupt flow to the orifice group of that unit.

BRIEF DESCRIPTION OF THE DRAWING

FIG. 3 is an enlarged sectional view of a portion of the system, with the cutting plane taken through line 3—3 of FIG. 2.

FIG. 4 is a sectional view of the gear pump shown in FIG. 3, the cutting plane indicated by line 4—4 in FIG. 3.

DESCRIPTION OF THE PREFERRED EMBODIMENTS

Figure 1:
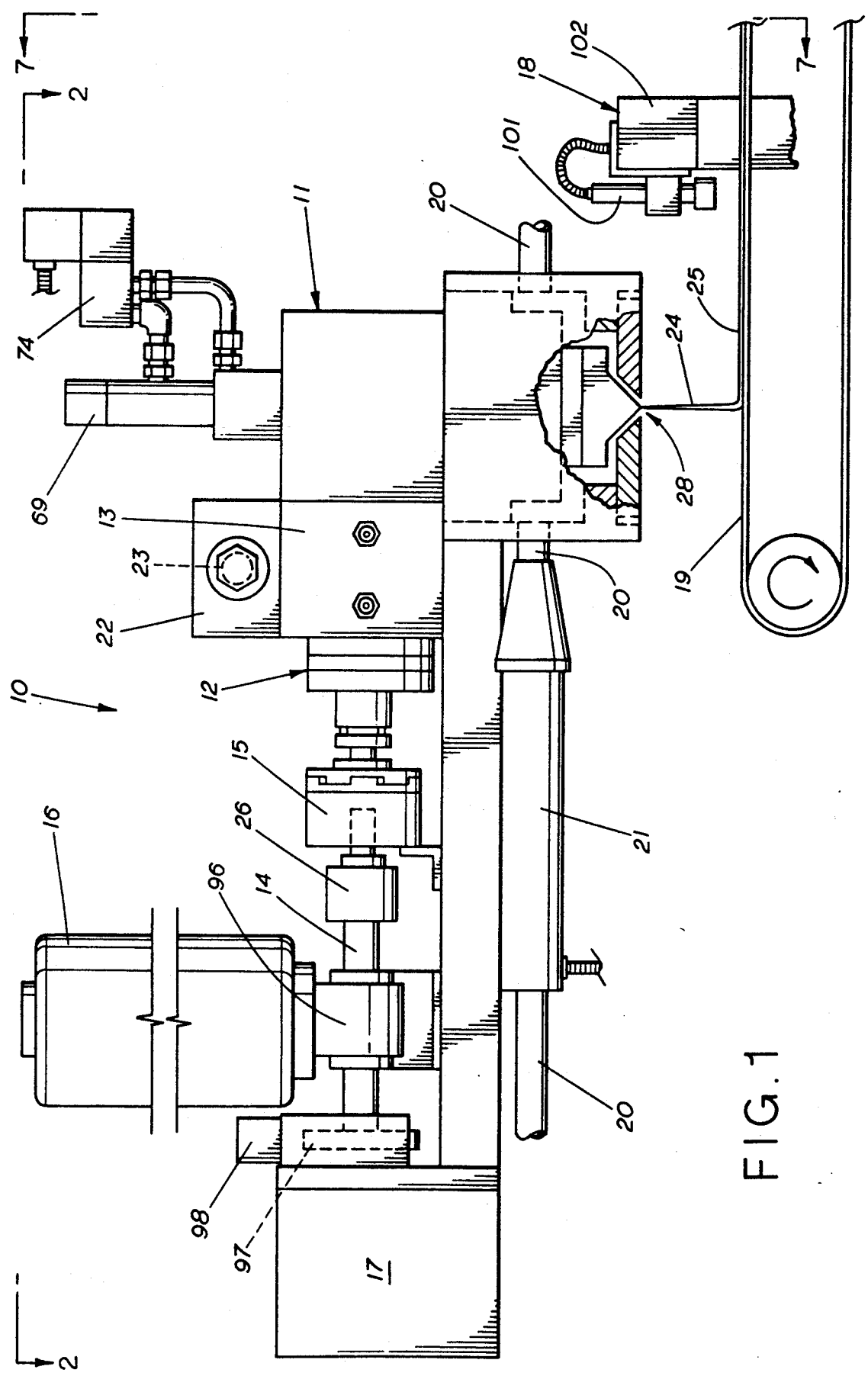
FIG. 1 is a side elevational view of a meltblowing system constructed according to the present invention.

With reference to FIG. 1, the meltblowing system 10 constructed according to the present invention comprises a plurality of meltblown units, each of which includes die assembly 11, a pump assembly 12, a pump manifold 13, a drive shaft 14, an electric motor 16, motor controls 17, and a sensor assembly 18. The drive shaft 14 may also include an electromagnetic clutch 15 and coupling 26. Hot air through lines 20, each of which may include an in-line heater 21, is delivered to opposite sides of the die assembly 11 and a revolving collector 19 is positioned below the die assembly 11 for receiving the meltblown fibers.

In FIGS. 2, 6, 7, 8, and 9, the different units of the system are designated by different letters with the same reference numeral for the corresponding part described above. For example, pump 12A is driven by motor 16A through shaft 14A. The pump 12A feeds polymer melt to a longitudinal portion of die assembly 11 designated 11A (as described in detail below).

Although the present invention is described with reference to four units, the invention contemplates a plurality of units ranging from 2 to 100 preferably 4 to 80, most preferably 4 to 50.

FIGS. 1, 3, 4, and 5 depict only one of the meltblowing units or component thereof of the system and are described without reference to the letters (i.e., A-D). It should be understood, however, that each meltblowing unit has components corresponding to those depicted in FIGS. 1, 3, 4, and 5, unless otherwise indicated.

Briefly, with reference to FIGS. 1 and 2, the meltblowing system of the present invention operates as follows: polymer melt is delivered to the apparatus through line 23 into manifold 22. The manifold 22 contains passages (described in detail below) which conduct the polymer melt to each of the pump assemblies 12A-12D, and from there to the separate die assemblies 11A-11D where the melt is extruded as a plurality of side-by-side filaments 24. Converging hot air delivered to the die via air conduits 20 contacts the extruded filaments 24 and stretches them into microsized filaments or fibers. These filaments or fibers collect on the collection surface 19 in a random manner forming a nonwoven web 25. (The terms "filaments" and "fibers" as used herein are interchangeable.) The web although integral in appearance, consists of longitudinal strips 25A-25D, which are respectively formed by units 11A-11D.

The side-by-side strips 25A-25D are monitored by scanner 18 which measures a physical property of each strip such as thickness or basis weight. The monitor 18 sends a signal to the controls 17A-17D, respectively, which in turn alter the operation of the variable speed electric motors 16A-16D, respectively, to increase or decrease the polymer throughput thereby maintaining uniformity of the selected property within each strip and/or across the width of the web 25.

The system 10 of the present invention will be described in detail with reference to the following main components: Die Assembly, Pump and Manifold Assemblies, Drive Shafts and Motors, and Controls.

Die Assembly

Figure 5:
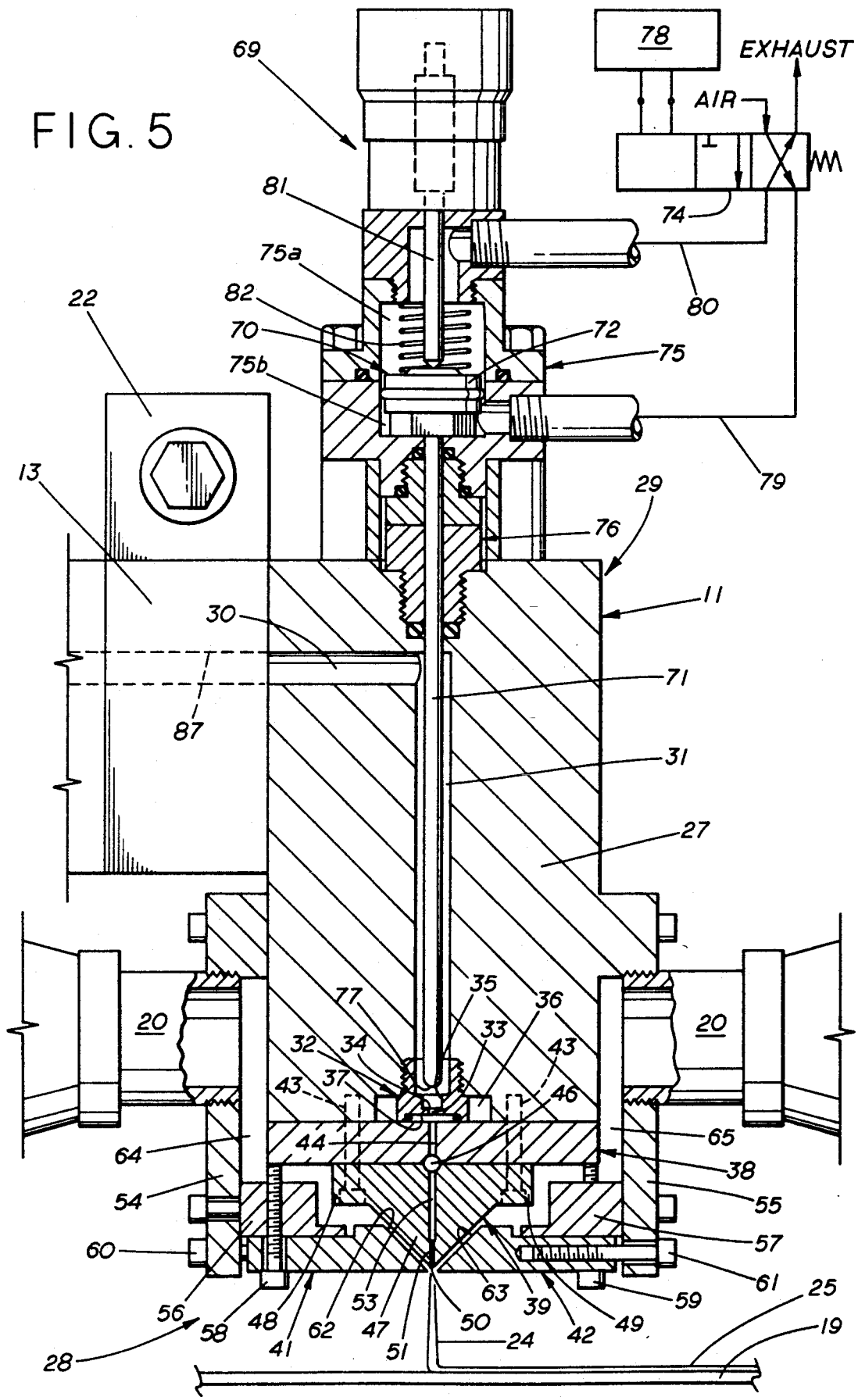
FIG. 5 is a sectional view of the die tip assembly and valve actuators of the system.

As best seen in FIG. 5, the die assembly 11 comprises an elongate die body 27, a die tip assembly 28 connected to the bottom (i.e. mounting surface) of the die body 27, and a plurality of valve assemblies 29, one for each die assembly unit 11A-11D as described below. The die body and die tip components, as well as other parts of the system exposed to the high meltblowing temperatures may be machined from steel or steel alloys.

The die body 27 has formed therein intersecting polymer flow passages 30 and 31 for each unit. Passage 30 is aligned with a polymer flow passage in the pump manifold 13 (as described below) and passage 31 extends vertically in body 27, exiting at the underside of the die body 27 and serves as the outlet passage for the die body 27. An insert 32 is mounted in recess 36 surrounding outlet passage 31. The exposed outer end of the insert 32 is spaced from the bottom of the recess 36 to provide an annular sealing surface 37 which engages a seal surface of the die assembly 28. The insert 32 has formed therein a port 33, surrounded by annular valve seat 34 and cylindrical surface 35. The manifolds and die body 27 may be provided with electric heaters (not shown) to heat and maintain the polymer passing therethrough at the desired temperatures.

The die tip assembly 28 is made up of three parts: (1) a transfer plate 38, (2) a die tip 39, and (3) air plates 41 and 42. The transfer plate 38 may be bolted to the underside of the die tip 39 and this assembly bolted to the mounting surface of the die body 27 by bolts 43.

The transfer plate 38 extends substantially the entire length of the die body 27 (see FIG. 7) and has formed therein a polymer passage 44 for each of the meltblowing units 11A-11D. The flow passage 44 exits into a semicircular groove formed in the underside of the transfer plate 38, which in combination with a similar groove formed in the underside of the die tip 39 defines an elongate header channel or chamber 46.

Figure 7:
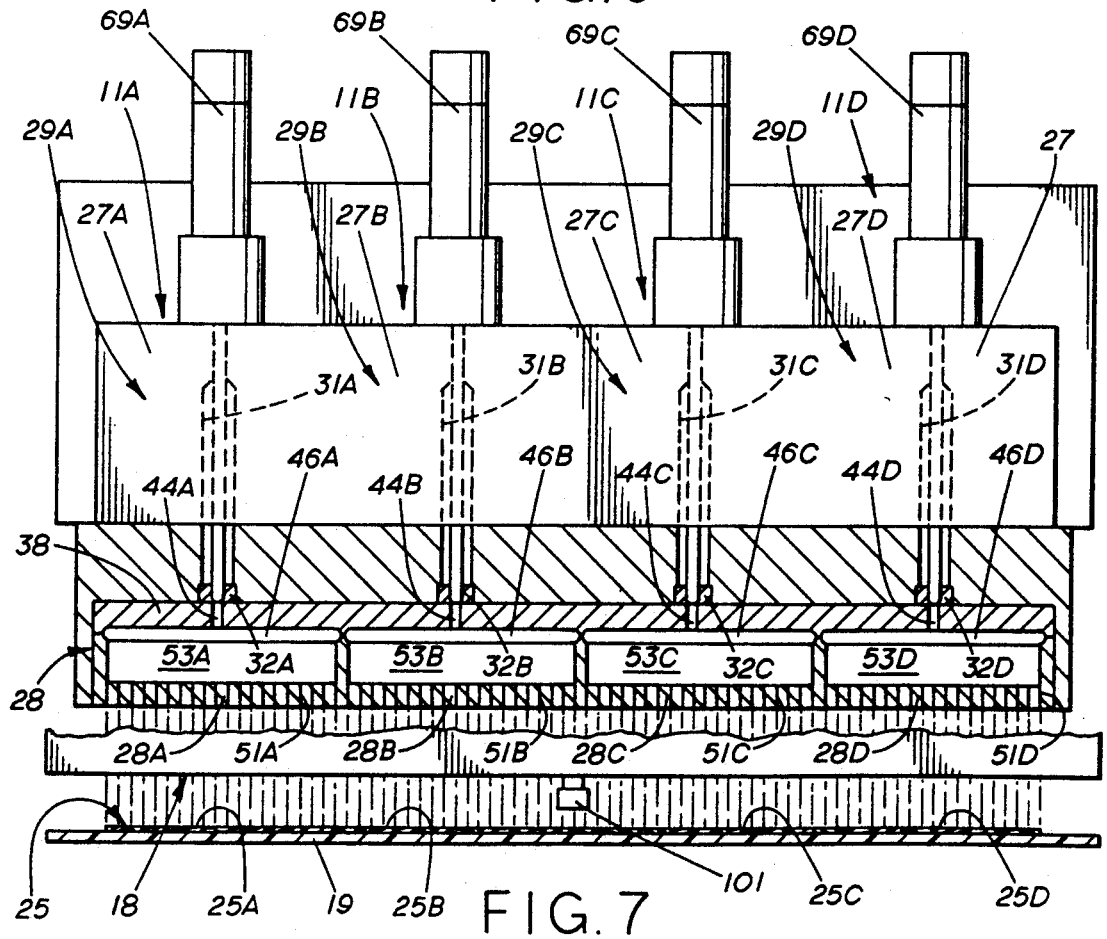
FIG. 7 is a simplified front elevational view of the die assembly from the perspective indicated by line 7—7 of FIG. 1.

The die tip 39 has formed therein a nose section 47 of triangular cross section which is flanked by elongate flanges 48 and 49. The nose section 47 terminates in an apex 50, through which are drilled a plurality of orifices 51 (see also 51A-51D in FIG. 7). Channel 53 interconnects chamber 46 with the orifices 51. The orifices 51 are aligned along the apex 50 to form a line therealong. It is preferred that the orifices 51 are equally spaced along the length of apex 50 as illustrated in FIG. 7 so that an integral single web 25 is formed on collector 19.

The assembly of the transfer plate 38 with die tip 39 bolted thereto is mounted to the underside of die body 27 by bolts 43 passing through flanges 48 and 49 and transfer plate 38. Annular seal surface 37 engages the underside of the transfer plate 38 and, aided by an O-ring, provides a fluid seal therewith.

The air plates 41 and 42 are mounted on side plates 54 and 55, which in turn are secured to die body 27. The air plates 41 and 42 may also include mounting blocks 56 and 57 which are adjustable thereby permitting the adjustment of the setback and air gap settings. Adjustment screws 58 and 59 permit the adjustment of the setback and adjustment screws 60 and 61 permit the adjustment of the air gap.

Figure 6:
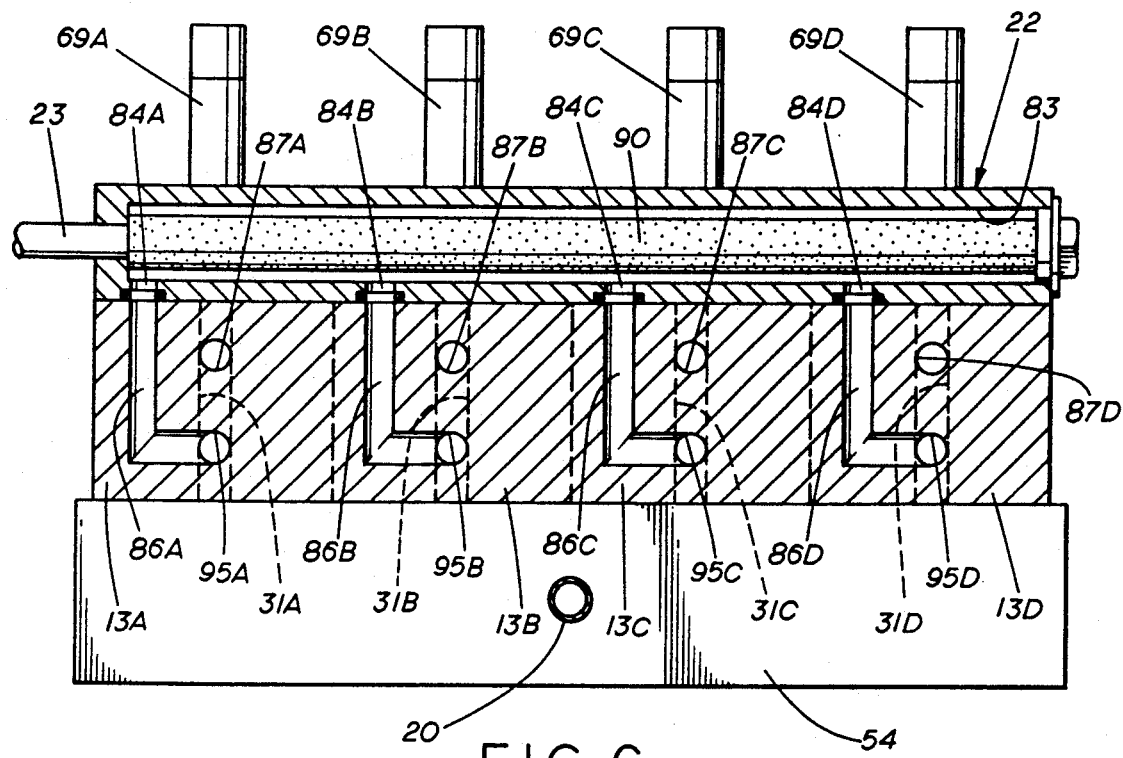
FIG. 6 is a sectional view of the die assembly shown in FIG. 3, with the cutting plane taken through line 6—6 thereof.

The inner surface of each air plate 41 and 42 is tapered and in combination with the flanking surfaces of the triangular nose section 47 define converging air passage 62 and 63. The spacing between the confronting surfaces is referred to as air gap. Air passages 64 and 65 upstream of air passages 62 and 63, respectively, are defined by the configuration of the die tip 39, the transfer plate 38, blocks 56 and 57, die body 27 and side plates 54 and 55 as illustrated in FIG. 5. As seen in FIG. 6, the air line 20 connects to a mid-section of each air plate 54 and 55.

Polymer flow through each die assembly unit is via passages 30 and 31 of the die body 27, through insert 32, through passage 44 of transfer plate, into chamber 46, through channel 53 and, finally, through orifices 51; whereas, air from the inlet pipes 20 flows through passages 64 and 62 on one side of the orifices and passages 65 and 63 on the other side, exiting as converging air sheets at apex 50 on opposite sides of the extruded filaments 24. The parallel flow through the meltblowing units 11A-11D is illustrated in FIG. 7.

Although not essential to the present invention it is preferred to provide each meltblowing unit 11A-11D with a shut off valve assembly 29 shown in detail in FIG. 5. The valve assembly 29 for each unit includes a stem 71 positioned concentrically in passage 31 and operatively connected to a valve actuator 69. The valve actuator for each unit comprises a piston assembly 70, and a pneumatic control valve 74. The valve stem 71 extends through a suitable packing assembly 76 into passage 31 terminating at valve tip 77. A piston 72 mounted in housing 75 divides tne interior thereof into upper chamber 75a and lower chamber 75b. The piston 72 is movable within housing 75 between an open position wherein the valve tip 77 is positioned above the valve seat 34 of insert member 32 and a closed position wherein the tip 77 seats on surface 34 thereby shutting off the flow of polymer through port 33. The valve is moved between the open and closed positions by control valve 74 which may be a solenoid, four-way, two position valve. Electric controls 78 activates and deactivates the solenoid of the control valve 74. To open the polymer flow port 33, the solenoid is energized causing air to flow from control valve 74 through line 79 to chamber 75b while air exhausts from chamber 75a through line 80. The piston 72 and stem 71 move upwardly opening port 33. Upward movement of the piston 72 is limited by adjustment rod 81.

In the normal deactivated position of the actuator 69, the solenoid of control valve 74 is de-energized causing air to flow through line 80 into the chamber 75a while air exhausts from the chamber 75b through line 79. Spring 82 biases the piston 72 in the closed position with tip 77 in contact with valve seat 34.

The construction and operation of the valve actuators 69 are described in more detail in co-pending U.S. application Ser. No. 599,006, filed on Oct. 17, 1990, (now U.S. Pat. No. 5,145,689), the disclosure of which is incorporated herein by references.

The hot air delivered to opposite sides of the die assembly 11 by lines 20 may include an in-line electric air heater 21 (see FIG. 1) which may be of the same construction as described in said co-pending application U.S. application Ser. No. 599,006 (U.S. Pat. No. 5,145,689).

As illustrated in FIG. 7, the die body 27, transfer plate 38, and die tip 39, as well as, the air plates 41 and 42 (components 39, 41, and 42 are shown generally as die tip assembly 28) are of the same general length, traversing the full length of the row of orifices 51. The die body 27, while being of unitary construction may be viewed as separate side-by-side sections 27A-27D provided with flow passages 30A-30D (not shown in FIG. 7) and 31A-31D, inserts 32A-32D, and valve assemblies 29A-29D (including actuators 69A-69D). Likewise, the die tip assembly 28 includes end-to-end chambers 46A-46D which are, respectively, aligned with die body sections 27A-27D. The polymer extruded through orifices (e.g. 51A) of one die assembly section (e.g., 28A) is from chamber (e.g., 46A) and is separate from the polymer extruded through the orifices (e.g., 51B-51D). Although the orifices are grouped into sections, the orifice spacing across the die length is preferably uniform so that the web produced thereby is uniform.

While the polymer flow is through separate meltblowing units 11A-11D in the system, only one air delivery system is provided. The air flow is through two main passages which converge on opposite sides of the nose piece 47 as has been described above in relation to FIG. 5. The air passages are not divided into units but extend substantially the entire length of the die.

Pump and Manifold Assemblies

As shown in FIG. 3, the inlet polymer flow passages 30 of each body section 27 is fed by pump 12. The polymer flow to and from the pump 12 of each unit is provided by passages formed in the header manifold 22 and pump manifold 13. Polymer is delivered to a passage 83 in header manifold 22 which distributes the flow to a plurality of flow passages 84 of the header manifold 22. Manifold 13 has formed therein a pump suction passage 86 which registers with header manifold passage 84 and the inlet of pump 12. A pump outlet passage 87 extends from the outlet of the pump 12 to register with inlet passage 30 of die body 27.

As shown in FIG. 6, polymer flow into the header manifold 22 is from line 23 and distributed header passages 83 to passages 84A-84D. Polymer is fed to each pump through passages 86A-86D, respectively, and discharged from pump 12A-12D (see FIG. 2) through passages 87A-87D, respectively, to die body inlet passages 30A-30D (not seen in FIG. 6) and outlet passage 31A-31D, respectively. The header passages 83 may be provided with a porous filter 90.

The pump 12 of each meltblowing unit may be any positive displacement pump which provides output rate proportional to drive shaft rotation rate. As illustrated in FIGS. 3 and 4, the preferred positive displacement pump is a gear pump which comprises a driven gear 88 keyed to shaft 14, and idler gear 89. The gears 88 and 89 are mounted in a suitable housing 91 having endplates 92 and 93. The housing 91 defines chamber 94 in which the gears 88 and 89 are mounted. Manifold passages 86 and 87 communicate with chamber 94 on opposite sides of the meshing gears through ports 95 and 99, respectively. Thus, as gear 88 is driven counterclockwise (as viewed in FIG. 4) gear 89 is driven in a clockwise direction thereby pumping polymer entering port 95 from passage 86 around the periphery of the gears and out through port 99 into passage 87. Conventional packing and bearings may be employed in the gear pump.

Drive Shafts and Motors

Figure 2:
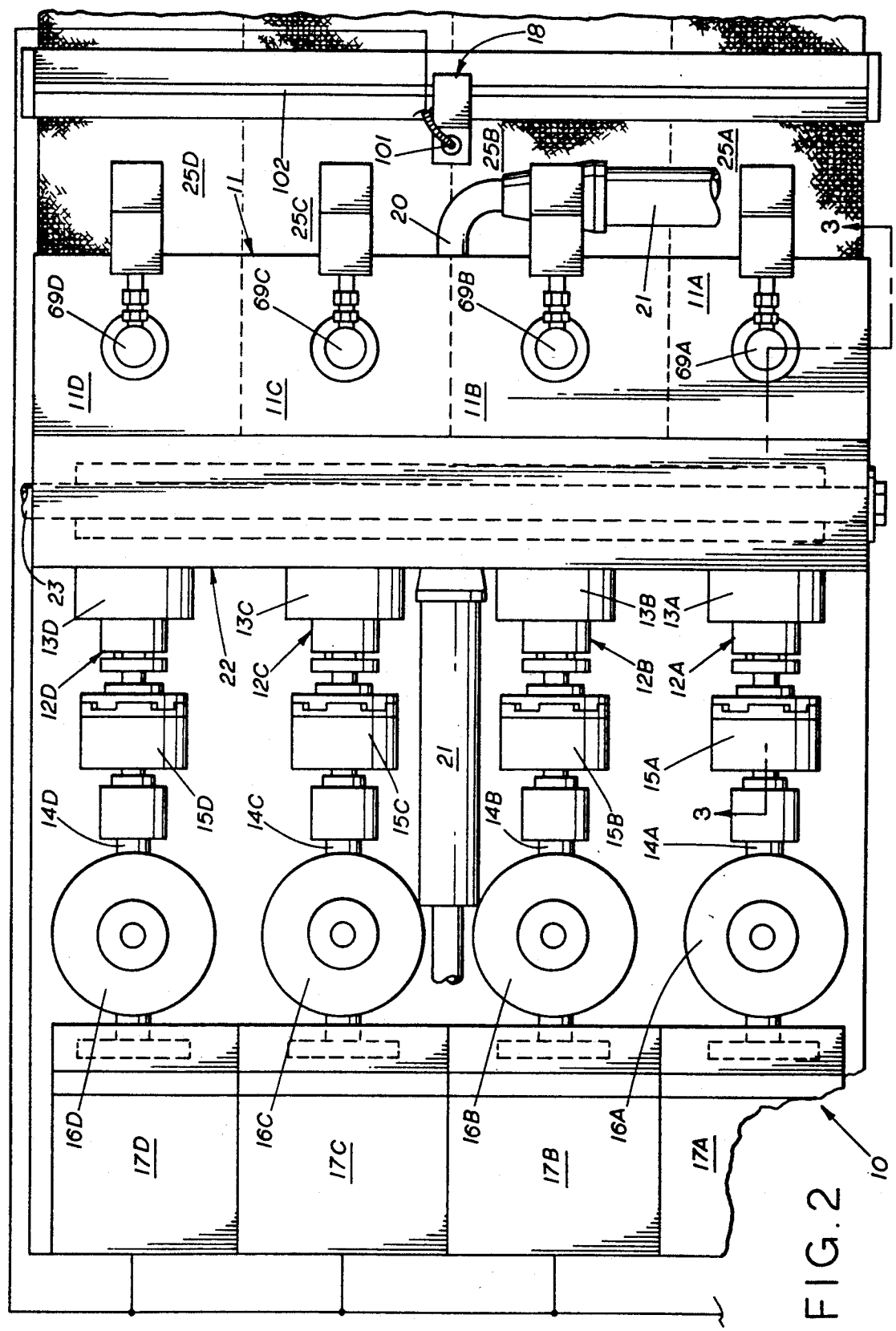
FIG. 2 is a top plan view of the system shown in FIG. 1.

As shown in FIGS. 1 and 2, the drive shaft 14 is driven by a variable speed motor 16 through gear box 96. The drive shaft 14 may also include a coupling 26 and electromagnetic clutch 15. The clutch 15 is a safety device to prevent damage to the motor if the pump 12 fails. The output shaft 14 extends through the gear box 96 terminating in pump speed sensor gear 97. It is preferred that the electric motor 16 be variable speed and have an rpm output between 1500 to 2000, and that the gear box 96 have a gear reduction ratio of 20 to 1. A sensor probe 98 such as a proximity switch or digital pulse encoders is used to detect the rpm of shaft 14. These devices are commercially available.

The electric motor 16 may be one of many designs and constructions. An electric motor that has proven successful in the apparatus of the present invention is manufactured by Baldor. This 1725 rpm motor with gear reducer box provides and output range of 0 to 104 rpm.

Controls

As mentioned previously, an important part of the present invention is the provisions of sensing means 18 for monitoring a property of the web 25 as it is collected on collector 19. Although, an on-line thickness gauge may be provided, such as a Model 6100 Series Basic Scanning System, marketed by NDC Systems, it is preferred that the monitor be a basis weight monitor such as a Gamma Backscatter Probe marketed by NDC Systems.

Figure 8:
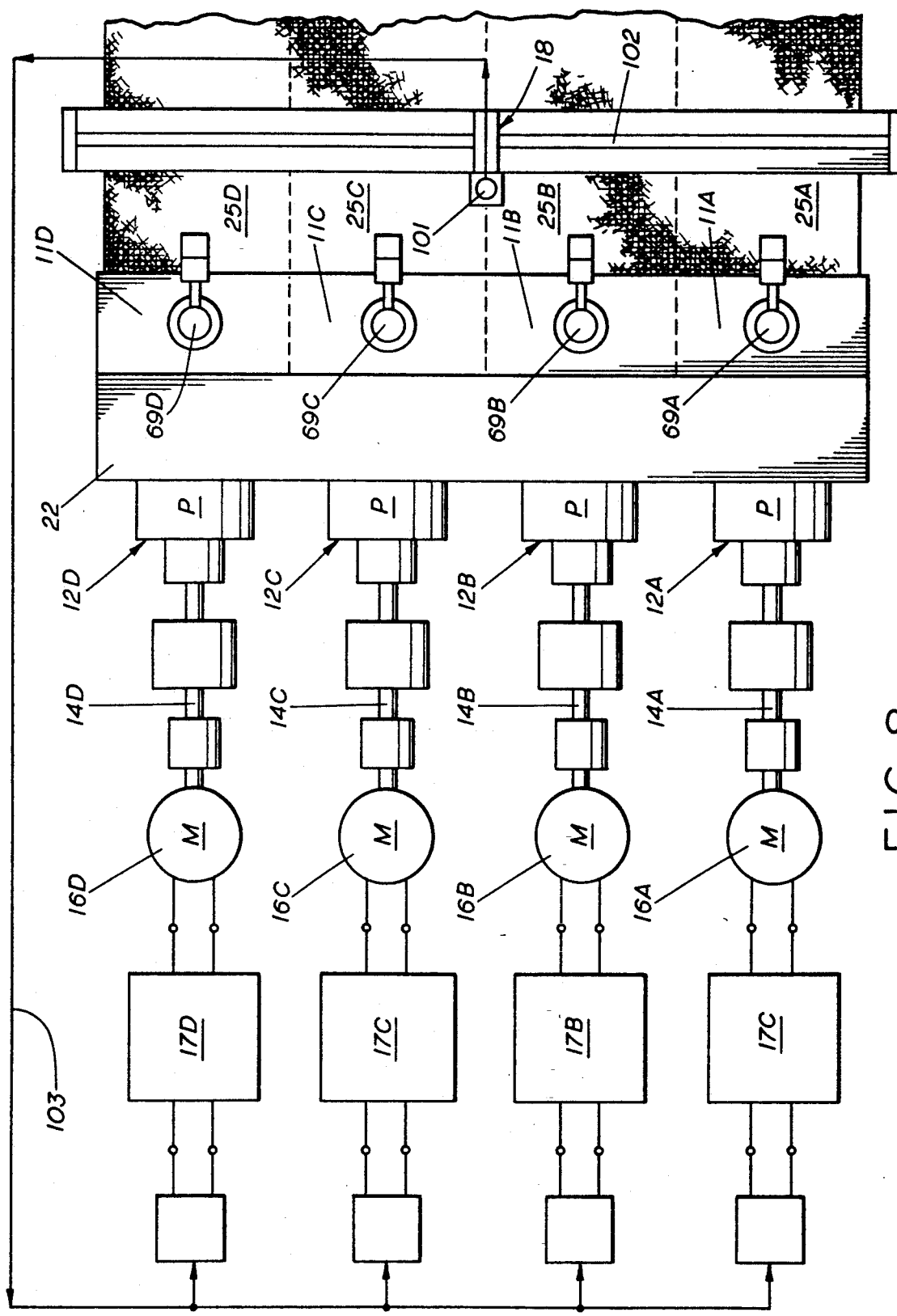
FIG. 8 is a schematic of the system, conceptually illustrating the feed back control of the system.

As shown in FIGS. 1 and 8, the sensing means 18 includes a sensing probe 101 mounted on a track 102 which traverses the width of the web 2b. The sensing probe 101 moves along the track scanning the web 25 and senses a property thereof such as the web thickness or the basis weight of the web 25. FIG. 8 illustrates in schematic the concept of operation of the various meltblowing units 11A-11D in response to a web property sensed by probe 101. In the preferred embodiment of the invention, the probe is a Gamma Backscatter Probe (Compton Photon Backscatter). Photons from a very small radioactive isotope are back scattered in direct proportion to the mass (i.e., weight per unit area or basis weight) of the web in front of the probe.

A scintillation detector and electronics convert the photon count to an electric signal which is transmitted through electric conductor 103 to a computer programmed to send signals to each of the pump controls 17A-17D corresponding to the sensed signal for strips 25A-25D, respectively of the web. Thus, as probe 101 moves along track 102 across strip 25A, a signal is received and transmitted to pump control 17A. The computer may also integrate the average of the signals to represent the average basis weight across web strip 25A. As the probe 101 continues along strip 25B, the probe 101 in a like manner sends signals to pump controls 17B, etc.

The controls are calibrated so that if the monitored property (e.g., basis weight) varies from a predetermined value, the signal to the electric motor of each meltblowing unit is adjusted to change the rpm and change the output of the gear pump for that unit. The sensor 98 senses the rpm of the drive shaft 14 via sensor gear 97 and provides a signal to the controls for controlling the motor rpm, thereby automatically setting the correct pump speed and polymer flow rate for achieving the desired web properties.

Probes, sensors, computers and controls for performing the functions described are available from a variety of companies including NDC Systems. It should be noted, however, that while NDC Systems advertise industrial application for these systems as including cast or extruded sheet and film, blown film, rubber and vinyl coatings, composites, pipe and tubing, paper and film, textiles and nonwovens, the sensing systems have never been used as described and claimed in the present invention: to sense a property in a relatively narrow longitudinal strip of a nonwoven web and alter the system output in response thereto.

Assembly

Although an almost infinite number of combinations and sizes of the meltblowing system components described above are possible, the following indicates the typical and preferred ranges.

|  | BROAD RANGE | PRE-FERRED RANGE | MOST PREFERRED RANGE BEST MODE) |
| --- | --- | --- | --- |
| Length of Die (inches) | 1–150 | 4–150 | 6–150 |
| Number of Units | 2–100 | 4–80 | 4–50 |
| Length of Units (inches) | 0.5–12.0 | 1–8 | 1.5–3.0 |
| Orifice Diameter (inches) | 0.010–0.080 | 0.010–0.040 | 0.015–0.030 |
| Orifices/inch | 10–50 | 15–40 | 20–30 |
| Gear Pump Capacity (for each Unit lbs/hr) | 1–20 | 2–12 | 4–10 |
| Polymer Flow Rate (per unit lbs/hr) | 1–20 | 2–12 | 4–10 |
| Polymer Flow Rate (per orifice grams/hol/min) | 0.8–3 | 0.9–2 | 1.0–1.6 |
| Air Gap (inches) | .010–.200 | .020–.150 | .040–.120 |
| Set Back (inches) | .010–.200 | .020–.150 | .040–.120 |
| Air Capacity (SCFM/inch) | 5–30 | 10–25 | 15–20 |

An important feature of the die assembly constructed according to the present invention is the intermittent operation. To minimize polymer after-flow with the valve shut, it is preferred that the volume between the valve seat and the orifice discharge be 0.3 cc per inch of die length, preferably between 0.2 to 0.3 cc per inch of die.

The meltblowing system of the present invention has been described to somewhat simplified design for clarity of description. In practice, many of the components illustrated as unitary bodies, such as die body and manifolds, may be made in two or more parts to facilitate assembly. Also, the system may include hoods or housings for safety and operation protection.

Operation

The components of the meltblowing system 10 are assembled as illustrated in FIGS. 1, 2, and 8. The valve actuators 69A-69D are adjusted to provide the desired stroke (e.g., 0.100 to 0.750 inches).

The collector 19 is positioned within about 5 to 15 inches below the die outlet and the probe 101 is positioned above the collector 19, in accordance with the manufacture's specification. It is preferred to locate the probe 4 to 24 inches downstream of the area in which the fibers are first collected on the collector 19, although this is not critical. The computer is adjusted to provide a control of the web property monitored (e.g., thickness or basis weight). In the case of basis weight control, typical values are 5 to 100 grams/square meter.

The system 10 may be fed by an extruder in a conventional hookup or it may be fed by a polymer delivery system disclosed in U.S. patent application Ser. No. 447,930, filed Dec. 8, 1989, now U.S. Pat. No. 5,061,170.

Any polymer capable of being meltblown may be used. The typical meltblowing web forming resins include a wide range of polyolefins such as propylene and ethylene homopolymers and copolymers. Specific thermoplastics includes ethylene acrylic copolymers, nylon, polyamides, polyesters, polystyrene, poly(methyl methacrylate), polytrifluoro-chloroethylene, polyurethanes, polycarbonates, silicone sulfide, and poly(ethylene terephthalate), pitch, and blends of the above The preferred resin is polypropylene. The above list is not intended to be limiting, as new and improved meltblowing thermoplastic resins continue to be developed.

The operating temperature of the meltblowing system will of course depend on the resin employed, but for PP (MFR of 800), they may be as follows:

Polymer temperatures 475 to 520 degrees Fahrenheit
Air temperatures 500 to 750 degrees Fahrenheit The fibers 24 collect on the collector 19 forming web 25 which passes under probe 101. The rate of the movement of the web typically is 10 to 300 feet per minute. The probe 101 moving along track 102 scans each strip 25A-25D of the full width of "60" web 25 in about 3-5 seconds. Variations of the basis weight of a web strip as detected and if outside the control range (+0.5%-1%), the speed of the motor 16 and gear pump 12 for that strip is changed in response thereto to bring the basis weight in conformity with the control value. For example, if the basis weight control level is 10 grams/square meter and a basis weight for web strip 25B is measured at 9.87 grams/m sq., the rpm of motor 16B and hence pump 12B is increased to increase the polymer throughput of meltblowing unit 11B. This increases the amount of fibers laid down to form strip 25B and increases the basis weight.

In shutting down the operation of the system, the valve assemblies 29A-29D are actuated closing the ports 33 of each meltblowing unit 11, thereby preventing after flow. Also, if orifices become plugged, the valve actuators 69 for the unit which contains the plugged orifice may be manually operated. The valve stem 71 passing into and in close conformity with the cylindrical surface 35 of insert 32 acts as a plunger causing a pressure or volume pulse or surge to flow through the downstream orifices 51 which removes any plugging or residue in or at the discharge of the orifices 51.

Experiment

A meltblowing system 10 having components as described above for the best mode and depicted in the Drawings was built. The system had four units and employed an extruder to provide the polymer melt. The system produced a web of 6 inches wide and a monitor (NDC Gamma Backscatter Probe) was used to detect the basis weight of the web, controlled at 15 GSM. The variation of the basis weight across the width of the web was +0.95%, which represents a high quality web.

Alternative Embodiment

As emphasized above, one of the main advantages of the system 10 constructed according to the present invention is that the die comprises a plurality of transverse meltblowing units positioned side-by-side, with each unit being provided with separate pump means and polymer flow passages. In the embodiment previously described, the pump means are separately controlled to make the positive displacement pumps responsive to changes in a web property such as thickness or basis weight. In the alternate embodiment described herein, the die assembly 11 is also constructed to function as a plurality of transverse side-by-side meltblowing units as described above and are also provided by separate gear pumps 12. In this alternative embodiment, however, the gear pumps 12 are driven by the same shaft or at the same rate so that the output of each meltblowing unit is precisely the same. This construction ensures that the polymer rate delivered to each unit and extruded therefrom is exactly the same as the polymer rate in the other units. This produces a uniform polymer output across the width producing uniform webs which of the die 11 becomes important for long dies that produce wide webs.

In this embodiment, it is essential that each meltblowing unit 11A-11D have a length not greater than 3 inches, and preferably between 0.5 to 2 inches. Each unit is also provided with from 20 to 30 orifices 51 per inch as described above.

The die assemblies 11A-11D and air delivery system as well as the valve assemblies 29A-29D may be the same in this alternate embodiment as those illustrated in FIGS. 1 and 5 and described above. The only difference between this embodiment with respect to the die assembly 11 is the flow passages from the gear pumps 12.

Figure 9:
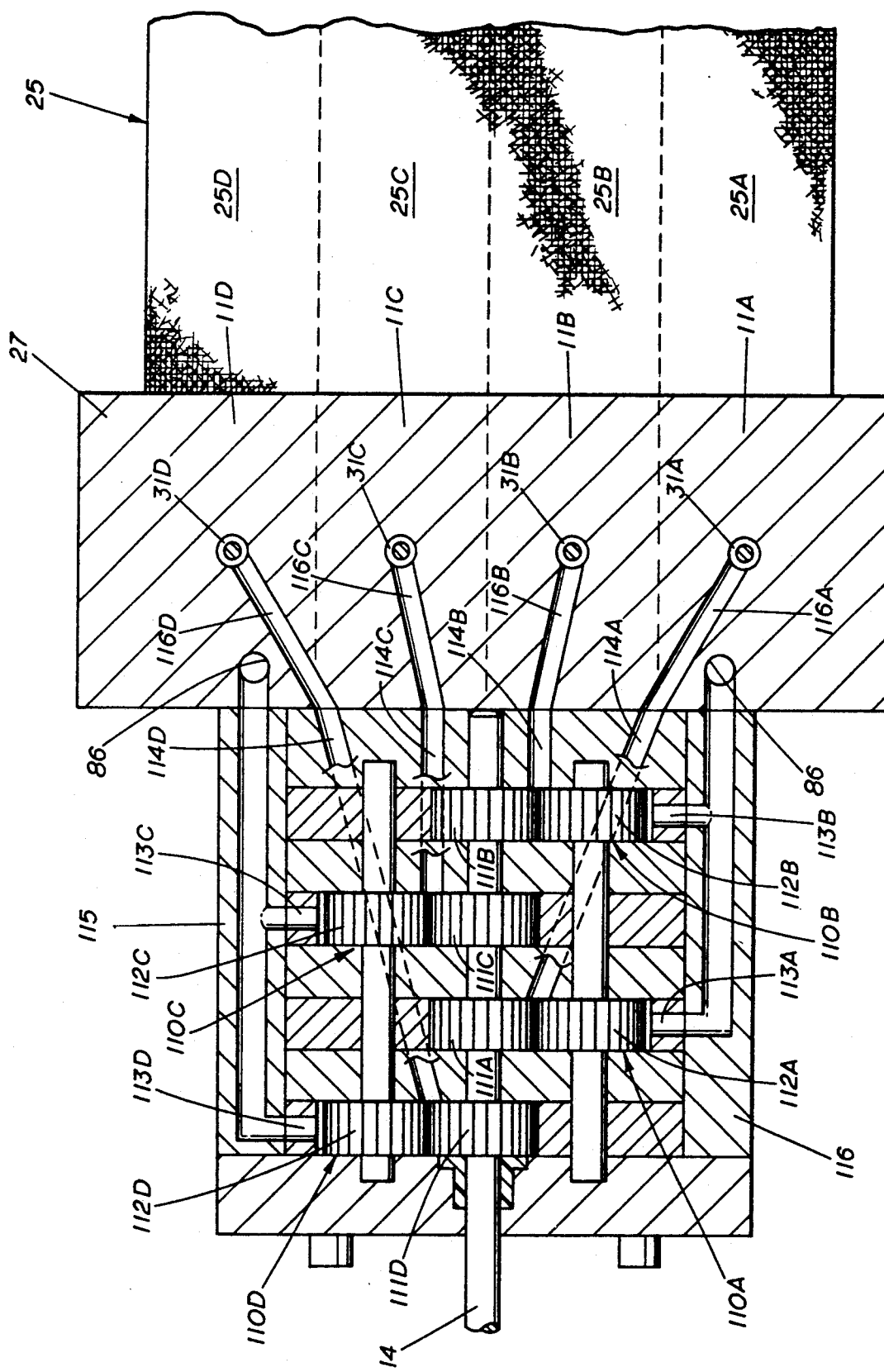
FIG. 9 is an alternate embodiment of the pumping assembly for the meltblowing system.

With reference to FIG. 9, the alternate embodiment includes a plurality of gear pumps arranged in stacked relationship and illustrated as 110A through 110D. Each of the gear pumps includes a driven gear 111A-111D, which meshes with idler gear 112A-112D, respectively. The driven gears 111A-111D are mounted on drive shaft 14 which is driven by a motor 16 which may be oriented as illustrated in FIG. 1. Thus, all gear pumps 110A-110D are driven by shaft 14. Each of the gear pumps 110A-110D has a polymer feed passage 113A-113D, respectively, and an outlet flow passage 114A-114D, respectively. Each of the gear pump outlet flow passages 114A-114D register with flow passages 116A-116D, respectively, formed in the die body 27. Flow passages 116A-116D deliver polymer to the flow passage 31A-31D, respectively, in the die body 27 which may be the same as described previously. The polymer is delivered to each pump 110A-110D through passages 113A-113D through manifolds 115 and 116.

As in the case of the embodiment illustrated in FIGS. 1 and 2, the embodiment illustrated in FIG. 9 employs parallel flow of polymer to each gear pump 110A-110D and from there to each meltblowing unit 11A-11D.

The main advantage of this alternate embodiment over the prior art systems is that the positive displacement pumps, being of the same size and driven by one shaft 14 at the same rpm, ensures that the flow to each unit is the same so that the web produced by the plurality of relatively short units will be uniform. Note, that the prior art dies required a coat hanger balancing die to deliver polymer from a single polymer inlet to the full width of the die. This prior art construction works well for short dies but for long dies, the polymer friction losses being different from the center of the die to the outer part and orifices of the die inherently produces uneven flow and web non-uniformities. Moreover, the coat hanger die is complex in configuration requiring expensive machining.

In order to achieve the uniform output of each meltblowing unit, it is only necessary that the pump outputs be separate and at the same rate. The suction lines of the pumps, however, may be common. For example, a gear pump manufactured by Zenith Nichols which is described as a 4 Stream, 6 Gear, Type H Pump which includes two separate pumping units. Each unit comprises a driven gear and two identical idler gears, thus functioning as two pumps with intermixing flow at the suction but separate flow at the discharge. Since the driven gear drives the two idler gears meshed therewith at the same rpm, the output of each is the same. This assembly thus produces four outlets with six gears, two of which are driven by the same shaft. Assemblies of one gear for driving four and eight idler gears are also available.

The polymer usable in this alternative design and the operation may be as described previously except that no sensors are provided so that the output may be not varied across the length of the die.

What is claimed is:

1. A method of meltblowing a polymer melt which comprises
   (a) extruding the polymer melt from a plurality of orifice groups to form a row of filaments;
   (b) blowing the filaments with air onto a moving collector to form a plurality of side-by-side web strips comprising entangled microsized filaments, each of said strips being formed by filaments extruded from a separate orifice group and extending in the direction of movement of the collector;
   (c) monitoring a physical property of each strip on the collector, said property being selected from the group consisting of thickness, basis weight, and density; and
   (d) controlling the throughput of polymer to each orifice group responsive to the monitoring step to maintain the property in each strip substantially at a predetermined value.

2. The method as defined in claim 1 wherein the polymer is extruded from 2 to 100 orifice groups to form from 2 to 100 side-by-side strips, respectively, which in combination form an integral web.

3. The method as defined in claim 1 wherein the property is basis weight (grams/square meter) and the monitoring step is by an electronic sensor directed at each strip and producing an output proportional to basis weight.

4. The method as defined in claim 3 wherein the controls for each orifice group are adapted to increase polymer flow in response to the monitored basis weight of the strip formed by filaments from said orifice group being below a predetermined level and decreasing polymer flow to said orifice group in response to the monitored basis weight being above the predetermined level.

5. A meltblowing die comprising
   (a) a die body having a mounting surface and plurality of separate polymer flow passages formed side-by-side therein in spaced apart relation, each flow passage having (i) an inlet and (ii) an outlet formed in the mounting surface of the die body;
   (b) a die tip assembly having (i) a base mounted on said mounting surface and having formed therein a plurality of elongate polymer header channels arranged in end-to-end relation, said base further including means for conducting polymer from each outlet to an associated one of the header channels; (ii) a die tip having a nosepiece extending outwardly from said base and terminating in an elongate apex and having polymer orifices arranged in a row along the apex at an equal spacing of from 10 to 50 orifices per inch and means interconnecting each polymer header channel with a longitudinal portion of the orifices, each longitudinal portion and each associated header channel having a length of from 1 to 8 inches; and (iii) air plates mounted on the die tip and having surfaces which in combination with the nosepiece define converging air channels which discharge at the apex of the nosepiece;
   (c) a rotary positive displacement pump for delivering a polymer melt to each inlet of the die body whereby the polymer melt flows through the die in parallel side by side streams, each stream comprising a polymer flow passage, a header channel and a longitudinal portion of the orifices; and
   (d) means for rotating the rotary pumps at substantially the same rpm whereby the flow rate of polymer melt to each header channel and each longitudinal portion of orifices is substantially the same.

6. The system of claim 5 wherein the rotary pumps are gear pumps and have substantially the same pumping capacity.

7. The system of claim 6 wherein the means for rotating the pumps includes a drive shaft and a motor for rotating the shaft, and wherein all of the gear pumps are driven by said shaft.

8. The system of claim 5 wherein the die assembly is provided with from 4 to 80 meltblowing units and a rotary pump for each unit.

9. The system of claim 5 wherein the die tip assembly is from 6 to 150 inches long and each unit is from 1.5 to 3 inches long.

10. A system for meltblowing a polymer melt to form microsized fibers which comprises
    (a) an elongate die body having first and second polymer flow passages formed therein;
    (b) an assembly die tip mounted on said die body and having (i) a die tip provided with first and second groups of orifices formed therein, and arranged in a line, and first and second flow chambers in fluid communication with said first and second die body flow passages, respectively, to distribute polymer to the orifices of the first and second groups of orifices, respectively;
    (c) means for delivering converging air sheets on each side of the orifices;
    (d) first and second rotary positive displacement pumps mounted on the die body to pump polymer melt into said first and second flow passages, respectively;
    (e) means for delivering the polymer melt to the first and second pumps, respectively;
    (f) first and second variable speed motors for driving the first and second pumps, respectively;
    (g) a collector for receiving filaments extruded from the first and second groups of orifices and as first and second strips, respectively; and
    (h) detector means for sensing a property of the filaments collected on the collector in the first and second strips, respectively, said first and second variable speed motors being operatively connected to the detector means to change the rotation rate and throughput of the first and second pumps, respectively, in response to deviations of the sensed property in the first and second strips from a predetermined control valve.

11. A die assembly comprising
    (a) a die body having (i) a mounting surface, and (ii) first and second polymer flow passages extending through the die body and having first and second outlets formed in the mounting surface at spaced apart locations;
    (b) a die tip having (i) a base mounted on the die body mounting surface and being coextensive therewith, (ii) a triangular nosepiece extending outwardly from the base and terminating in an apex which extends parallel to the plane of the mounting surface and being substantially coextensive therewith, (iii) air plates mounted on opposite sides of the nosepiece and being substantially coextensive therewith and therewith defining converging air channels which discharge at the apex, (iv) first and second header channels formed in the base and arranged in end-to-end relationship and extending parallel to said apex, (v) first and second conduits formed in the base for conducting polymer melt from the first and second polymer flow passage outlets to the first and second header channels, respectively, and (vi) first and second groups of orifices formed along the apex and, respectively, being in fluid communications with the first and second header channels, each of said first and second groups of orifices extending from 1 to 8 inches along the apex, the first and second groups of orifices having from 10 to 50 orifices per inch which are uniformly spaced along the full length of the apex;

(c) a rotary positive displacement pump for delivering a polymer melt to each inlet of the die body whereby the polymer melt flows through the die assembly in parallel side by side streams, each stream comprising a polymer flow passage, a header channel and a longitudinal group of the orifices; and (d) means for rotating the rotary pumps at substantially the same rpm whereby the flow rate of polymer melt to each header channel and each longitudinal group of orifices is substantially the same.

12. The system as defined in claim 11 and further comprises (i) a monitor for monitoring a physical property of the web along the width thereof, said property being selected from the group consisting of web thickness, basis weight, and density, and (ii) controls operatively responsive to the monitor for varying the rotation of said motor in response to changes in the monitored physical property.

13. The meltblowing die assembly of claim 11 wherein the means for rotating each pump is a separate variable speed motor and wherein the die assembly further includes control means for rotating each pump at a predetermined speed whereby flow through each group of orifices may be controlled.

14. The meltblowing die assembly of claim 13 wherein the control means provides for substantially the same rotation rate of each pump so that polymer flow through each orifice group is substantially the same.

15. The meltblowing die assembly of claim 13 wherein the control means provides for rotation of at least two of the pumps at predetermined but different speeds so the polymer flow rates through the two respective orifice groups fed by said pumps are different.

16. The meltblowing die assembly of claim 12 wherein each pump is a gear pump and the drive means is a variable speed electric motor.

17. The die assembly of claim 12 wherein the die assembly further includes a valve in each polymer flow passage between the pump and die tip outlet and means to selectively open and shut said valve.

18. The die assembly of claim 17 wherein the valve means includes a stem and a valve insert shaped so that movement of the stem into the insert creates a pressure pulse of sufficient magnitude to clean residual polymer from the orifices downstream therefrom.

19. A meltblowing assembly comprising
(a) a meltblowing die having a plurality of side-by-side units formed therein, each unit being adapted to extrude a plurality of filaments therefrom;
(b) a moving collector for collecting the filaments as a unitary web, each group of filaments forming a strip in the web whereby the web comprises a plurality of side-by-side longitudinal strips;
(c) a pump for delivering a polymer melt to each unit of the meltblown die;
(d) means mounted above the collector for monitoring a physical property of each strip in the web, said property being selected from the group consisting of the thickness, basis weight, and density; and
(e) control means operatively connected to the monitoring means for controlling the polymer output of each pump in response to the monitoring means whereby the physical property of each strip may be controlled to a predetermined value.

* * * * *